United States Patent
Pham et al.

(10) Patent No.: US 10,872,071 B2
(45) Date of Patent: Dec. 22, 2020

(54) AUTOMATIC LIVE-AGGREGATE PROJECTION REFRESH RESPONSIVE TO ON-DEMAND FLATTENED TABLE REFRESH

(71) Applicant: ENTIT Software LLC, Sanford, NC (US)

(72) Inventors: Thao Nguyen Pham, Cambridge, MA (US); Yuanzhe Bei, Cambridge, MA (US); Michael Leuchtenburg, Cambridge, MA (US); Hoa Binh Nga Tran, Andover, MA (US)

(73) Assignee: MICRO FOCUS LLC, Santa Clara, CA (US)

( * ) Notice: Subject to any disclaimer, the term of this patent is extended or adjusted under 35 U.S.C. 154(b) by 158 days.

(21) Appl. No.: 16/368,428

(22) Filed: Mar. 28, 2019

(65) Prior Publication Data

US 2020/0311043 A1    Oct. 1, 2020

(51) Int. Cl.
*G06F 7/00* (2006.01)
*G06F 16/22* (2019.01)
*G06F 16/242* (2019.01)

(52) U.S. Cl.
CPC ........ *G06F 16/2282* (2019.01); *G06F 16/242* (2019.01)

(58) Field of Classification Search
CPC .............. G06F 16/2282; G06F 16/242; G06F 16/2465; G06F 16/24539
USPC ................... 707/714, 717, 718, 769
See application file for complete search history.

(56) References Cited

U.S. PATENT DOCUMENTS

| | | |
|---|---|---|
| 6,882,993 B1 | 4/2005 | Lawande et al. |
| 7,111,020 B1 | 9/2006 | Gupta et al. |
| 7,890,497 B2 | 2/2011 | Folkert et al. |
| 7,930,297 B2 | 4/2011 | Yu et al. |
| 8,347,204 B2 * | 1/2013 | Rosner ............ G06F 40/177 715/227 |

(Continued)

FOREIGN PATENT DOCUMENTS

WO    2017027015 A1    2/2017

OTHER PUBLICATIONS

C. Bennett. Aggregate Projections, Feb. 27, 2018, Micro Focus International, <https://www.vertica.com/blog/aggregate-projections/>.

(Continued)

*Primary Examiner* — Md I Uddin (57) ABSTRACT

A flattened table (FT) of a database of a database management system (DBMS) is defined. The FT logically materializes a number of columns over a number of partitions. The columns include normalized columns, denormalized columns from a plurality of source tables of the database, as well as an aggregate column defining an aggregation of a selected normalized column over a selected denormalized column. A live-aggregate projection (LAP) is defined on the FT of the database. The LAP corresponds to the aggregate column and physically materializes the aggregation of the selected denormalized column over the selected denormalized column, as defined by the aggregate column. The FT is refreshed on-demand, on a per-column, per-partition basis. Responsive to the FT being refreshed on-demand, the LAP is automatically refreshed.

12 Claims, 7 Drawing Sheets

(56) References Cited

U.S. PATENT DOCUMENTS

9,311,355 B2    4/2016    Santosuosso

OTHER PUBLICATIONS

Vertica Integration with Looker: Tips and Techniques, 2018, Micro Focus International, <https://www.vertica.com/kb/LookerTipsAndTechniques/Content/Partner/LookerTipsAndTechniques.htm>.
Loading and Refreshing, Oracle8i Data Warehousing Guide, Release 2 (8.1.6), Part No. A769 94-01, Oracle Corporation, 2000, <https://docs.oracle.com/cd/A87860_01/doc/server.817/a76994/refresh.htm>.
L. Hobbs. Improving Performance using Query Rewrite in Oracle Database 10g, Dec. 2003, Oracle Corporation, Oracle White Paper, <https://www.oracle.com/technetwork/middleware/bi-foundation/twp-bi-dw-improve-perf-using-query-133436.pdf>.
J. Zhou, P. -A. Larson, and H. G. Elmongui. Lazy maintenance of materialized views. In Proceedings of the 33rd International Conference on Very Large Data Bases, VLDB '07, pp. 231-242. VLDB Endowment, 2007.
M. Stonebraker and A. Weisberg. The voltdb main memory dbms. IEEE Data Eng. Bull., 36(2):21-27, 2013.
M. Staudt and M. Jarke. Incremental Maintenance of Externally Materialized Views. In VLDB, 1996.
K. Salem, K. Beyer, B. Lindsay, and R. Cochrane. How to roll a join: Asynchronous incremental view maintenance. In Proceedings of the 2000 ACM SIGMOD International Conference on Management of Data, SIGMOD '00, pp. 129-140, New York, NY, USA, 2000. ACM.
D. Quass. Maintenance expressions for views with aggregation. pp. 110-118, 1996.
T. Palpanas, R. Sidle, R. Cochrane, and H. Pirahesh. Incremental maintenance for non-distributive aggregate functions. In Proceedings of the 28th International Conference on Very Large Data Bases, VLDB '02, pp. 802-813. VLDB Endowment, 2002.
I. S. Mumick, D. Quass, and B. S. Mumick. Maintenance of data cubes and summary tables in a warehouse. In ACM Sigmod Record, vol. 26, pp. 100-111. ACM, 1997.
C.-P. Li and S. Wang. Efficient incremental maintenance for distributive and non-distributive aggregate functions. Journal of Computer Science and Technology, 21(1):52-65, 2006.
A. Lamb, M. Fuller, R. Varadarajan, N. Tran, B. Vandiver, L. Doshi, and C. Bear. The Vertica Analytic Database: C-store 7 Years Later. In VLDB, 2012.
W. Labio, J. Yang, Y. Cui, H. Garcia-Molina, and J. Widom. Performance issues in incremental warehouse maintenance. In In Proceedings of the 26th International Conference on Very Large Data Bases (VLDB'00), Cairo, Egypt, Sep. 2000. Stanford InfoLab, 1999.
H. He, J. Xie, J. Yang, and H. Yu. Asymmetric batch incremental view maintenance. In Data Engineering, 2005. ICDE 2005. Proceedings. 21st International Conference on, pp. 106-117. IEEE, 2005.
T. Griffin and L. Libkin. Incremental maintenance of views with duplicates. In Proceedings of the 1995 ACM SIGMOD International Conference on Management of Data, SIGMOD '95, pp. 328-339, New York, NY, USA, 1995. ACM.
S. Ceri and J. Widom. Deriving Production Rules for Incremental View Maintenance. In VLDB, 1991.
J. A. Blakeley, P.-A. Larson, and F. W. Tompa. Efficiently updating materialized views. In ACM SIGMOD Record, vol. 15, pp. 61-71. ACM, 1986.
I. Mami, R. Coletta, Z. Bellahsene, Modeling View Selection as a Constraint Satisfaction Problem, International Conference on Database and Expert Systems Applications, DEXA 2011.
Oracle Database, World's Only Autonomous Database Delivers Unrivaled Capabilities, accessed online Nov. 19, 2018, <https://www.oracle.com/database.
R. G. Bello, K. Dias, A. Downing, J. Feenan, J. Finnerty, W. D. Norcott, H. Sun, A. Witkowski, and M. Ziauddin. Materialized views in oracle. In In Proc. of the 1998 Intl. Conf. on Very Large Data Bases, pp. 659-664, 1998.
In-Memory Database, Voltdb, http://voltdb.com/. 2018.
Teradata, http://www.teradata.com, 2018.
7 Refreshing Materialized Views in Oracle, https://www.oracle.com/, Oracle Help Center, 2017.
S. Sarsfield. Vertica Blog—Big Flat Fact Tables. May 11, 2017, <https://www.vertica.com/blog/big-flat-fact-tables/.
M. Leuchtenburg. OLAP in the Big Data Era—In or outside of Hadoop. HP Big Data Conference, Aug. 10, 2015.
IBM DB2, Explore Db2 family of products, accessed online Nov. 19, 2018, <https://www.ibm.com/analytics/us/en/db2/.
SQL Server 2016, Microsoft, <https://www.microsoft.com/en-us/sql-server/sql-server-2016.
Introducing the next step in Netezza's evolution: IBM Integrated Analytics System. accessed online Nov. 19, 2018, <https://www.ibm.com/analytics/netezza.
N. Tran. Vertica Live Aggregate Projections, Modern Materialized Views for Big Data. Vertica/HP, Nov. 2015.
S. Shah. Vertica Blog—Flattened Tables. Dec. 4, 2017, https://www.vertica.com/blog/flattened-tables/.
Vertica Documentation, Vertica Analytics Platform, Software Version 8.1.x, Jan. 30, 2019, Micro Focus/Vertica.

\* cited by examiner

AUTOMATIC LIVE-AGGREGATE PROJECTION REFRESH RESPONSIVE TO ON-DEMAND FLATTENED TABLE REFRESH

BACKGROUND

Data is the lifeblood of many entities like business and governmental organizations, as well as individual users. Large-scale storage of data in an organized manner is commonly achieved using databases. Databases are collections of information that are organized for easy access, management, and updating. Data may be stored in tables over rows (i.e., records or tuples) and columns (i.e., fields or attributes). In a relational database, the tables have logical connections, or relationships, with one another, via keys, which facilitates searching, organization, and reporting of the data stored within the tables.

DETAILED DESCRIPTION

As noted in the background, databases store data in tables over rows and columns, where the tables can be interrelated with one another in relational databases. A query is a request for data or information stored in a database in one or more tables. A query may be formulated in a particular query language, such as the structured query language (SQL).

A materialized view (MV) is a database object that contains the results of a query. Unlike a non-materialized view, an MV physically materializes a query in that the query result can be physically stored on a storage device. That is, an MV can store query results in a table-like form. An MV may be a local copy of data that is located remotely, a subset of the rows and/or columns of a table or join result, or may be a summarization of data in aggregate form.

Because MVs are physical materializations, they can become out-of-date and stale when their underlying data changes. Therefore, MVs have to be updated to ensure that they accurately and in an up-to-date manner reflect their underlying data. Such refreshing of an MV is generally controlled in a rule-based manner. Specifically, sometimes an MV may be updated automatically, such as when its underlying data changes or periodically, and at other times an MV may have to be updated on-demand, as triggered by a user.

Knowing when an MV will be updated can be confusing to database administrators. A database administrator may assume that an MV will be updated automatically when its underlying data changes. If this assumption is incorrect, then the MV will not accurately reflect its underlying data. A database administrator may conversely assume that an MV has to be updated on-demand when in fact the MV is updated automatically when its underlying data change. The result in this case is performance degradation, since the on-demand refresh of the MV is unnecessary.

Furthermore, when the underlying data for a column of an MV is updated, the MV may have to have all of its columns updated. That is, the MV as a whole is updated, and not just the columns affected by the update. For example, an MV may physically materialize an aggregation of select columns of one or more tables stored over two partitions. All of the columns of the MV may automatically update even if just one column has in actuality been changed. This means that the MV is needlessly refreshed in its entirety when in fact just select columns have been updated.

Similarly, refreshing the MV on-demand may result in recalculation of the MV over both partitions. However, the rows of just one partition may have been updated. The result in this case is that the processing cost in updating the MV is needlessly large, since the MV in actuality just has to be updated with respect to the rows of the updated partition, and not with respect to the rows of the partition that did not change.

Techniques described herein ameliorate these shortcomings associated with MVs. A flattened table (FT) of a database is defined that logically materializes a number of columns over a number of partitions. The columns can include denormalized columns from a number of source tables, key columns relating the source tables to the FT, columns of the FT itself (i.e., normalized columns), and aggregate columns defining aggregations of selected normalized columns over selected denormalized columns. A live-aggregate projection (LAP) corresponding to an aggregate column can be defined on the FT. The LAP physically materializes the aggregation of the selected normalized column over the selected denormalized column.

FTs, such as those found in the Vertica Analytics Platform ("Vertica") database available from Vertica Systems, of Cambridge, Mass., which is a subsidiary of Micro Focus International plc, of Newbury, U.K., are refreshed on-demand, and can be refreshed on a per-column, per-partition basis. That is, an FT may not refresh automatically, but rather when an update of the FT is triggered on-demand, and just as to specified columns and partitions. Columns that have not changed, and partitions that remain unchanged, are not updated when the FT is otherwise refreshed on-demand.

LAPs, which are also provided in the Vertica database, by comparison are refreshed automatically, once any underlying data has changed. By permitting LAPs to be defined on FTs, the confusing update rules of MVs are avoided. A database administrator knows that FTs are refreshed on-demand, and that LAPs are refreshed automatically. Therefore, the potential that a physical materialization will be assumed to update automatically (when in fact it will not) or has to be updated on-demand (when it fact it will refresh automatically) is avoided, unlike with MVs.

While currently a LAP can ostensibly be defined on an FT, in practical effect LAPs are not able to be used in conjunction with FTs. That is, currently defining a LAP on an FT results in an error when a column of the FT to which the LAP pertain is attempted to be refreshed on-demand. The net result, therefore, is that LAPs are practically unusable with FTs.

The techniques described herein permit LAPs to be usably defined on FTs, and provide an update mechanism by which such LAPs are updated. An FT is first refreshed on-demand, on a per-column, per-partition basis. A LAP defined on the FT is then responsively refreshed automatically. For instance, non-LAP projections also defined on the FT that relate to the same denormalized column(s) that the LAP projection does may be updated in parallel. As soon as the first such projection has finished updating, the LAP can begin refreshing, even before all projections relating to the denormalized column(s) in question have themselves finished refreshing.

As noted above, unlike MVs, which may have to be refreshed over all columns and partitions, FTs can be refreshed on a per-column, per-partition basis. This in turn means that a LAP defined on an FT is automatically refreshed just if it pertains to an aggregate column defining an aggregation of a normalized column over a selected denormalized column that has changed when the FT was updated on-demand. Performance is thus improved, because an FT can be updated just as to the partition(s) and column(s) that have changed, and also because any LAPs defined on the FT are then responsively automatically updated just if the columns to which they pertain have been updated in the FT.

Figure 1A:
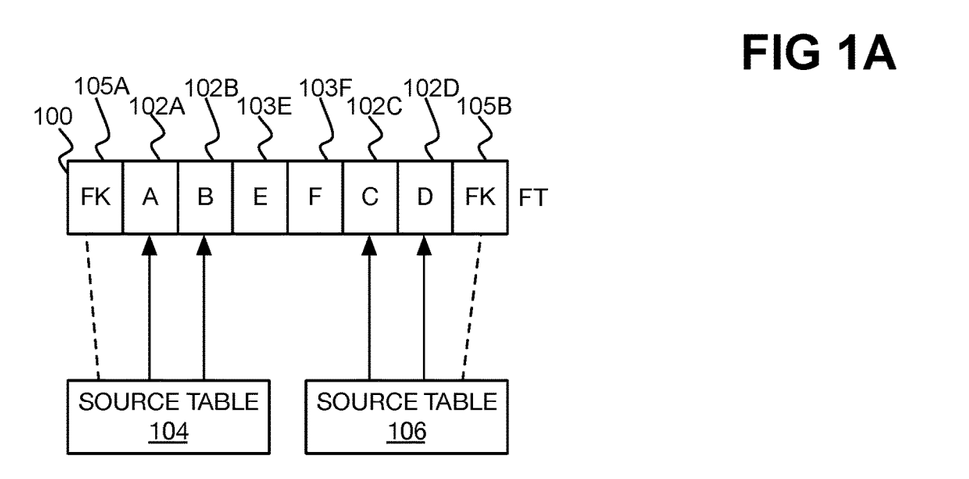
FIGS. 1A and 1B are diagrams of an example flattened table (FT) including denormalized columns and aggregate columns.
Figure 1B:
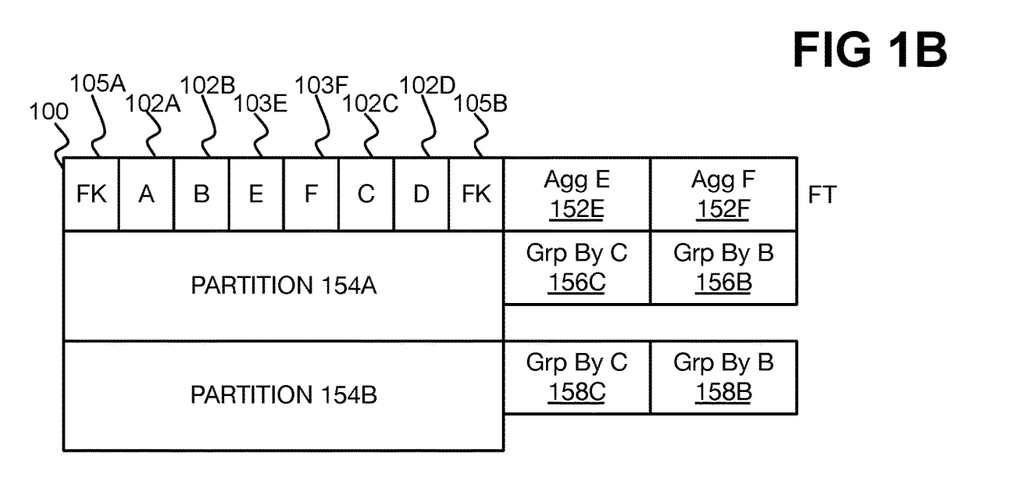

FIGS. 1A and 1B show an example flattened table (FT) 100. Among other columns, the FT 100 includes four columns 102A, 102B, 102C, and 102D, collectively referred to as the columns 102. There can be fewer than, or more typically, more than four columns 102.

As depicted in FIG. 1A, the columns 102 are denormalized from source tables 104 and 106. Specifically, the columns 102A and 102B are denormalized from source table 104, whereas the columns 102C and 102D are denormalized from source table 106. The source tables 104 and 106 typically include more columns than the columns 102. Via denormalization of the columns 102 from the source tables 104 and 106, queries can be run against the data stored over the columns 102 without having to join the source tables 104 and 106, since the columns 102 have already been denormalized from the source tables 104 and 106 within the FT 100.

The columns 102 are thus referred to as denormalized columns. The FT 100 further is said to logically materialize the denormalized columns 102. The FT 100 materializes the columns 102 in that the definition of the FT 100 specifies which columns 102 are part of the FT 100 and the source tables 104 and 106 from which the columns 102 are denormalized. This materialization is a logical materialization because the FT 100 does not store the denormalized columns 102 separately from the source tables 104 and 106, such as within a different file(s) or other storage location, however.

The FT 100 also includes columns 103E and 103F, which are collectively referred to as the columns 103. Unlike the denormalized columns 102, which are denormalized from source tables 104 and 106, the columns 103 are not denormalized from any other table, and store data that can be interrelated to the data of the columns 102 denormalized from tables 104 and 106. The columns 103 therefore can be considered normalized columns. There can be fewer than, or more typically, more than two normalized columns 103.

The FT 100 further includes foreign key columns 105. The foreign key columns 105 each store unique keys by which the source tables 104 and 106 are related to the FT 100. The foreign key column 105A relates the FT 100 to the source table 104, whereas the foreign key column 105B relates the FT 100 to the source table 106.

For example, the FT 100 may store sales data of sales of items to customers, the source table 104 may store item data providing further information regarding each unique item, and the source table 106 may store customer data provide further information regarding each unique customer. Each sale in the FT 100 pertains to an item having a particular key in the key column 105A, and likewise each item in the source table 104 has a particular key. Similarly, each sale in the FT 100 pertains to a customer having a particular key in the key column 105B, and likewise each customer in the source table 106 has a particular key. The key columns 105 thus permits the source tables 104 and 106 to be related to the FT 100, and thus have their columns 102, along with the normalized columns 103 of the FT 100, joined in a database query.

In this example, the FT 100 is a fact table, and the sources table 104 and 106 are dimension tables. The key in the key column 105A that relates the FT 100 and the source table 104 is considered a foreign key from the perspective of the FT 100, and is considered a primary key from the perspective of the source table 104. Similarly, the key in the key column 105*b* that relates the FT 100 and the source table 104 is considered a foreign key from the perspective of the FT 100, and is considered a primary key from the perspective of the source table 106. There may be other source tables that are dimension tables as well, which the FT 100 as a fact table references by other keys (in other key columns) that are foreign keys of the FT 100 and primary keys of these other source tables.

In general, the dimension tables (i.e., the source tables 104 and 106) are much smaller in size than the fact table (i.e., the FT 100), and provide additional information, or dimensions, for the information contained in the FT 100. In the example, multiple sales in the FT 100 can pertain to the same item in the source table 104 and/or to the same customer in the source table 106. Therefore, the relationship between the fact table and each dimension table can be a many-to-one relationship, or conversely, the relationship between each dimension table and the fact table can be a one-to-many relationship. For instance, each item in the source table 104 may be referenced by multiple sales in the FT 100, and likewise each customer in the source table 106 may be referenced by multiple sales in the FT 100.

As depicted in FIG. 1B, the data stored in the columns 102 of the FT 100 as denormalized from the source tables 104 and 106 of FIG. 1A, as well as the data stored in the normalized columns 103 and 105, are stored over storage partitions 154A and 154B, which are collectively referred to as the storage partitions 154. Each storage partition 154 may include one or more data files, for instance, over which rows of data having values for the columns 102A and 102B denormalized from the source table 104, rows of data having values for the columns 102C and 102D denormalized from the source table 106, and/or rows of data having values for the columns 103 of the FT 100 are stored. As such, the source tables 104 and 106 are considered to store row data for the denormalized columns 102 and for the normalized columns 103 over the partitions 154. The partitions 154 also store row data for the key columns 105.

In addition to the denormalized columns 102, the normalized columns 103, and the key column 105, the FT 100 further includes aggregate columns 152C and 152D as depicted in FIG. 1B, which are collectively referred to as the aggregate columns 152. Each aggregate column 152 defines an aggregation function of the values of multiple rows that are grouped together to form one or more summary values. Examples of aggregation functions include average, count, maximum, median minimum, mode, range, and sum, for instance. The aggregation functions of the aggregate column 152 may aggregate values of the denormalized columns 102 and/or of the normalized columns 103, as grouped together by other of the columns 102 and/or 103.

In the example of FIG. 1B, the aggregate column 152E specifies an aggregation function of the normalized column 103E over the denormalized column 102C, whereas the aggregate column 152F specifies an aggregation function of the normalized column 103F over the denormalized column 102B. Specifically, the aggregate column 152E defines an aggregation, such as the summation of the values of the normalized column 103E, for each unique value within the denormalized column 102C. That is, the aggregate column 152E groups the summations of the values of the normalized column 103E by the unique values within the denormalized column 102C. Similarly, the aggregate column 152F defines an aggregation, such as the maximum value of the column 103F, for each unique value within the denormalized column 102B. That is, the aggregate column 152F groups the maximizations of the values of the normalized column 103F by the unique values within the denormalized column 102B.

The aggregate columns 152 are defined for each partition 154. Therefore, for the data rows stored in the partition 154A, the aggregate column 152E specifies the aggregation for each unique value for the denormalized column 102C stored by these data rows. That is, the aggregate column 152E groups the defined aggregation of the normalized column 103E of the data rows of the partition 154A for each unique value that these data rows store in the denormalized column 102C, which is indicated in FIG. 1B as "Grp By C" 156C. The aggregate column 152E likewise groups the defined aggregation of the normalized column 103E of the data rows of the partition 154B for each unique value that these data rows store in the denormalized column 102C, as indicated in FIG. 1B as "Grp By C" 158C. Similarly, the aggregate column 152F groups the defined aggregation of the normalized column 103F of the data rows of the partition 154A for each unique value that these data rows stored in the denormalized column 102B, which is indicated in FIG. 1B as "Grp By B" 156B. The aggregate column 152F groups the defined aggregation of the normalized column 103F of the data rows of the partition 154B for each unique value that these data rows store in the denormalized column 102B, as indicated in FIG. 1B as "Grp By B" 158B.

Figure 2A:
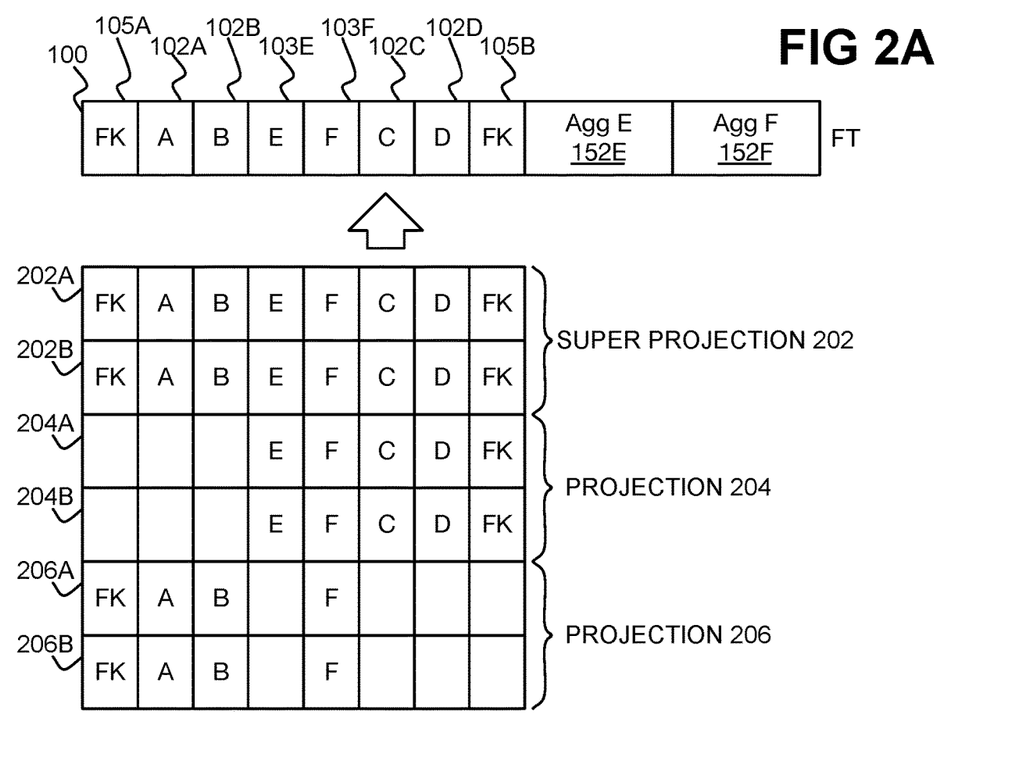
FIGS. 2A and 2B are diagrams of example projections and live-aggregate projections (LAP) defined on the example FT of FIGS. 1A and 1B.

FIG. 2A shows example projections 202, 204, and 206 defined on the FT 100. Each projection 202, 204, and 206 corresponds to a selected set of the columns 102, 103, and 105 of the FT 100. That is, each projection 202, 204, and 206 includes one or more of the columns 102, 103, and 105 and not any of the aggregate columns 152, of the FT 100.

The projections 202, 204, and 206 physically materialize their respective sets of the columns 102, 103, and 105. Each of the projections 202, 204, and 206 materializes its respective set of the columns 102, 103, and 105 in that each projection 202, 204, and 206 specifies the particular columns 102, 103, and 105 that are part of its set of the columns 102, 103, and 105. The materializations are physical materializations in that the projections 202, 204, and 206 define where these sets are stored in physical storage, such as a data file. As such, the projections 202, 204, and 206 in effect copy the columns 102, 103, and 105 as stored over the partitions 154, into a new physical storage. That is, the projections 202, 204, and 206 store the columns 102, 103, and 105 redundantly to the storage of these columns within the partitions 154.

In the example of FIG. 2A, the projection 202 can be considered a super projection, because it includes all the columns 102, 103, and 105 of the FT 100. The super projection 202 can in one implementation include a super projection 202A for the records stored in the partition 154A and a super projection 202B for the records stored in the partition 1546. The projection 204 includes just the denormalized columns 102C and 102D and the normalized columns 103E and 103F of the FT 100. The projection 204 does include the key column 105B so that the columns 102C and 102D can be related to the columns 103E and 103F; this is because the columns 102C and 102D are denormalized from the source table 106, and the FT 100 is related to the source table 106 via the key column 105B. The projection 204 can in one implementation span a projection 204A for the records stored in the partition 154A and a projection 204B for the records stored in the partition 1546.

The projection 206 includes just the denormalized columns 102A and 1026 and the normalized column 103F of the FT 100. The projection 206 does include the key column 105A so that the columns 102A and 1026 can be related to the column 103F; this is because the columns 102C and 102D are denormalized from the source table 104, and the FT 100 is related to the source table 106 via the key column 105A. The projection 206 can in one implementation span a projection 206A for the records of the partition 154A and a projection 206B of the records of the partition 154B. As noted above, in one implementation each projection 202, 204, and 206 spans or includes a projection for each partition 154. However, in another implementation, each projection 202, 204, and 206 may just include a single projection for all the partitions 154.

Figure 2B:
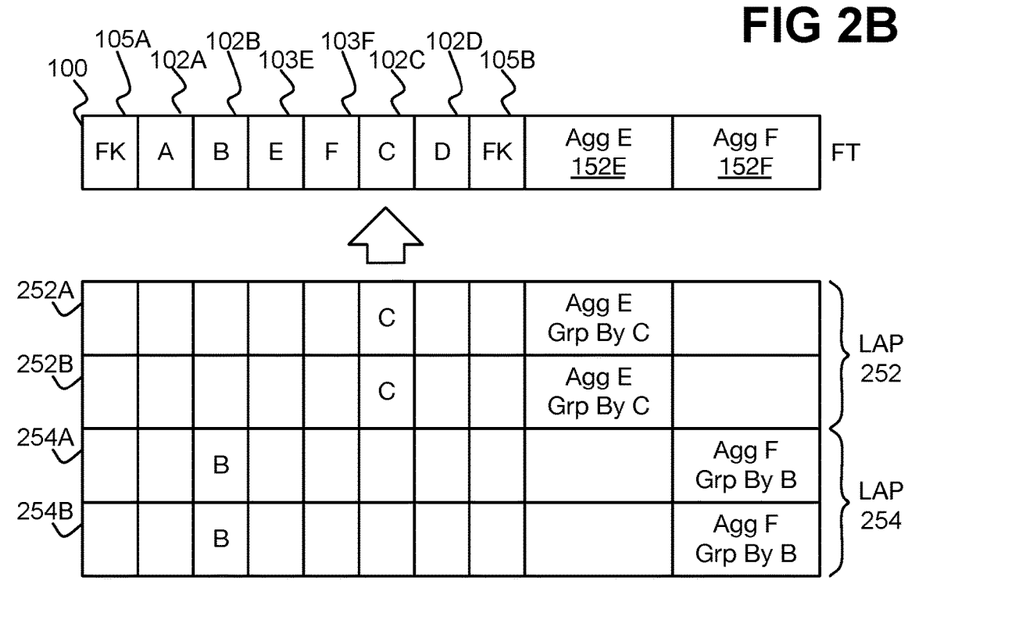

FIG. 2B shows example live-aggregate projections (LAPs) 252 and 254 defined on the FT 100. Each LAP 252 and 254 corresponds to an aggregate column 152 of the FT 100. The LAPs 252 and 254 each physically materialize the aggregation of the normalized column 103 defined by its corresponding aggregate column 152 over a corresponding denormalized column 102. Each of the LAPs 252 and 254 is a materialization in that it specifies the aggregate column 152 to which the LAP 252 or 254 corresponds. Each of the LAPs 252 and 254 is a physical materialization in that each LAP 252 and 254 define where the aggregation defined by its corresponding aggregate column 152 is stored in physical storage, such as a data file. That is, the LAPs 252 and 254 store their aggregations of the normalized columns 103 over the denormalized columns 103 redundantly to the storage of the columns 102 and 103 within the partitions 154.

In the example of FIG. 2B, the LAP 252 physical materializes the aggregation of the normalized column 103E over the denormalized column 102C, as defined by the aggregate column 152E corresponding to the LAP 252. Therefore, the LAP 252 can in one implementation include a LAP 252A that materializes the aggregation of the values of the column 103E for the unique values of the denormalized column 102C of the data records stored in the partition 154A. The LAP 252 similarly can in one implementation include a LAP 252B materializing the aggregation of the values of the column 103E for the unique values of the denormalized column 102C of the data records stored in the partition 154B. In another implementation, the LAP 252 may just include a single projection for all the partitions 154.

In the example of FIG. 2B, the LAP 254 physically materializes the aggregation of the normalized column 103F over the denormalized column 102B, as defined by the aggregate column 152F corresponding to the LAP 254. Therefore, the LAP 254 can in one implementation include a LAP 254A that materializes the aggregation of the values of the normalized column 103F for the unique values of the denormalized column 102B of the data records of the partition 154A. The LAP 254 can in one implementation similarly include a LAP 254B materializing the aggregation of the values of the column 103F for the unique values of denormalized column 102B of the data records of the partition 154B. In another implementation, the LAP 254 may include just a single projection for all the partitions 154.

The FT 100 itself is refreshed, or updated, manually on-demand, on a per-column and per-partition basis. This means that when the underlying source tables 104 and 106 of the denormalized columns 102 of the FT 100 change as stored on the partitions 154 and 156, the FT 100 is not automatically refreshed. Rather, the FT 100 has to be manually refreshed, on-demand. Furthermore, the FT 100 does not have to be refreshed in its entirety. Rather, a particular denormalized column(s) 102 of the FT 100 for which data records are stored in a particular partition(s) 154 of the FT 100 can be specified. Therefore, just the specified denormalized column(s) 102 over the specified partition(s) 154 and 156 are refreshed.

By comparison, the projections 202, 204, and 206, and the LAPs 252 and 254, defined on the FT 100 are refreshed automatically, when their underlying data is refreshed. The projections 202, 204, and 206 are refreshed automatically when their corresponding denormalized columns 102 of the FT 100 have been refreshed on-demand. The automatic refreshing of the projections 202, 204, and 206 is a granular refreshing, in that just the projections 202, 204, and 206 specifying columns 102 of the FT 100 that have been refreshed are refreshed. Furthermore, of these projections 202, 204, and 206, the only columns 102 that may be refreshed are those that have been refreshed in the FT 100 itself. Such granular refreshing is further on a per-partition basis, so that refreshing of the projections 202, 204, and 206 in question occurs just as to the partitions 154 and 156 specified in the on-demand refreshing of the FT 100.

Similarly, the LAPs 252 and 254 are refreshed automatically when the denormalized columns 102 defined by the aggregate columns 152 of the FT 100 corresponding to the LAPs 252 and 254 have been refreshed on-demand within the FT 100. As with the automatic refreshing of the projections 202, 204, and 206, the automatic refreshing of the LAPs 252 and 254 is a granular refreshing. Just the LAPs 252 and 254 corresponding to aggregate columns 152 defining aggregations of the denormalized columns 102 that have been refreshed in the FT 100 itself are refreshed. Granular refreshing of the LAPs 252 and 254 is also on a per-partition basis. Refreshing of the LAPs 252 and 254 in question occurs just as to the partitions 154 and 156 specified in the on-demand refreshing of the FT 100.

In the examples of FIGS. 1A, 1B, 2A, and 2B, then, the FT 100 is decoupled from the source tables 104 and 106, such that changes in the tables 104 and 106 do not automatically propagate to the FT 100. Rather, the FT 100 has to be manually refreshed, on-demand. Such refreshing of the FT 100 can be performed by querying the source tables 104 and 106 on a per-column and per-partition basis, for one or more particular denormalized columns 102 and one or more particular partitions 154. Furthermore, the LAPs 252 and 254 are coupled to the denormalized columns 102 defined in the aggregations of the aggregate columns 152 to which the LAPs 252 and 254 correspond. Changes in the FT 100 can be automatically propagated to the LAPs 252 and 254 through one or more intervening projections 202, 204, and 206 that include the denormalized columns 102 in question.

Figure 3A:
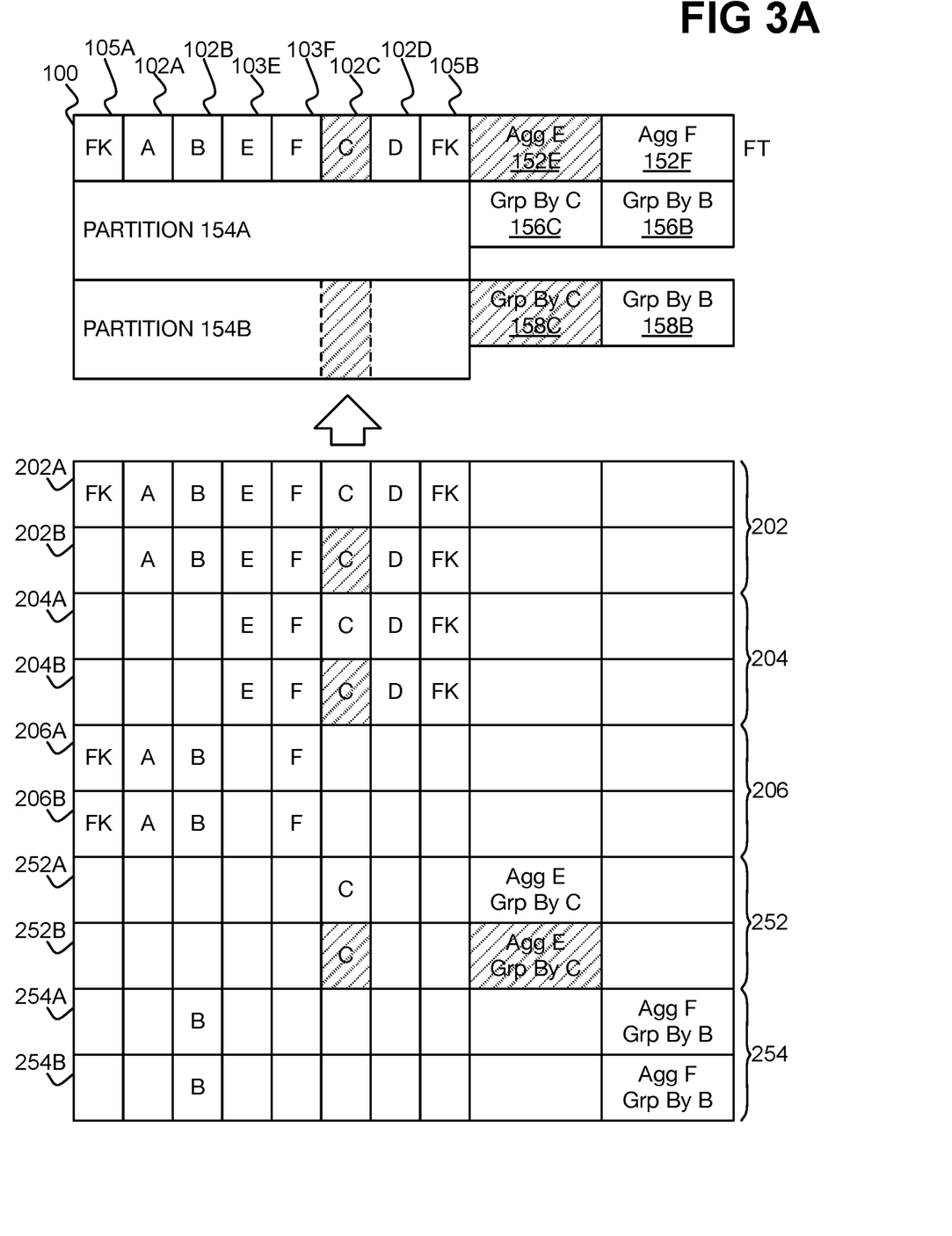
FIG. 3A is a diagram of example refreshing of the FT of FIGS. 1A and 1B, the projections of FIG. 2A, and the LAPs of FIG. 2B.

FIG. 3A shows example refreshing of the FT 100, the projections 202, 204, and 206, and the LAPs 252 and 254. In the example of FIG. 3A, a user like a database administrator has manually initiated an on-demand refresh of the FT 100, particularly specifying the partition 154B and the denormalized column 102C. This means that the data records of just the partition 154B (and not those of the partition 154A) are updated with respect to their values for denormalized column 102C (and not with respect to their values for any of the other denormalized columns 102A, 102B, and 102D). Updating of just the column 102C over the partition 1546 is denoted in FIG. 3A via shading.

Responsive to this granular on-demand refresh of the FT 100, the projections 202, 204, and 206, and the LAPs 252 and 254, are automatically refreshed. More specifically, those of the projections 202, 204, and 206 and those of the LAPs 252 and 254 affected by the refreshing of the column 102C the FT 100 over the partition 1546 are automatically refreshed. As such, just those of the projections 202, 204, and 206 including the denormalized column 102C are updated. Similarly, just those of the LAPs 252 and 254 corresponding to aggregate columns 152 defining an aggregation of the denormalized column 102C are updated.

Therefore, the projections 202B and 204B are updated, which are the projections 202 and 204 for the partition 1546. The projections 202B and 204B are updated just as to the denormalized columns 102C—as indicated by shading in FIG. 3A—and not with respect to the other columns 102A, 1026, and 102D, 103E and 103F, which were not updated in the FT 100. The projections 202 and 204 for the partition 154A—i.e., the projections 202A and 204A—are not updated, even though the projections 202 and 204 include the denormalized column 102C, because the on-demand refresh of the FT 100 was just over the partition 1546 and not over the partition 154A. The projection 206 is not updated for either partition 154A or partition 1546, because the projection 206 does not include the column 102C. For instance, the projection 206B is not updated, even though it pertains to the partition 154B, because the projection 206 as a whole does not include the denormalized column 102C.

The LAP 252B is also updated, which is the LAP 252 for the partition 154B, as indicated by shading in FIG. 3A. This is because the LAP 252B corresponds to the aggregate column 152E over the partition 154B (i.e., "Grp By C" 158C), and just the aggregate column 152E and the partition 154B are affected by the on-demand refresh of the denormalized column 102C over the partition 154B, as denoted in FIG. 3A by shading. The LAP 252 for the partition 154A—i.e., the LAP 252A—is not updated, even though the LAP 252 corresponds to the aggregate column 152E defined on the column 103E over the denormalized column 102C, because the on-demand refresh of the FT 100 was just over the partition 154B and not over the partition 154A. The LAP 254 is not updated for either partition 154A or partition 154B, because the LAP 254 corresponds to the aggregate column 152F defined on the column 103F over the denormalized column 102B, which was not part of the on-demand refresh of the FT 100.

Figure 3B:
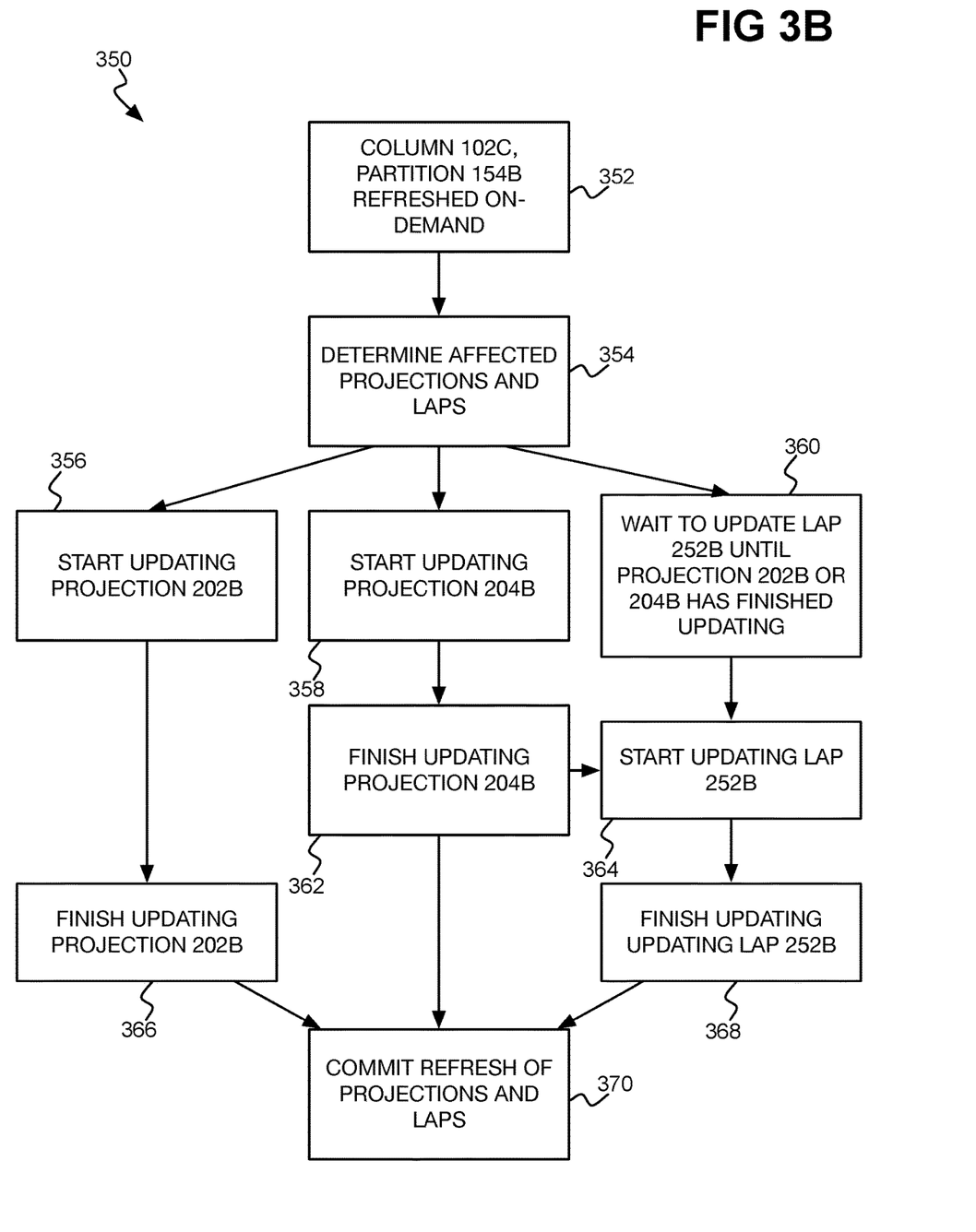
FIG. 3B is a diagram of an example process by which the example refreshing of FIG. 3A can be performed.

FIG. 3B shows an example process by which the refresh of the FT 100, the projections 202, 204, and 206, and the LAP 252 and 254 in FIG. 3A may be performed. The denormalized column 102C of the FT 100 is refreshed over the partition 154B on-demand (352). In response to refreshing the FT 100, which of the projections 202, 204, and 206 and which of the LAPs 252 and 254 are affected by refreshing the denormalized column 102C over the partition 154B is determined, to initiate automatic refresh of the projections 202, 204, and 206 and the LAPs 252 and 254 (354). As noted above, just the projections 202B and 204B, and just the LAP 252B are affected by the on-demand refresh of the column 102C over the partition 154.

The automatic refresh of the projections 202B and 204B and the LAP 252B may be performed in parallel, as depicted in FIG. 3B. For instance, separate threads may refresh the projections 202B and 204B and the LAP 252B. The threads may run on different processing cores of the same or different processors, such as central processing units (CPUs) or graphical processing units (GPUs).

Updating of the projection 202B is thus initiated (356), as is updating of the projection 204B (358). By comparison, updating of the LAP 252B waits until the projection 202B and/or the projection 204B has finished updating (360). In this implementation, the LAPs 252 are updated from updated projections 202, 204, and 206, as opposed to from the columns 102 and/or 103 of the FT 100 itself. In the example being described, the LAP 252B can be updated from the projection 202B and/or the projection 204B. The LAP 252B may be updated from the projection 202B or projection 204B that finishes updating first. It is not necessary to wait to start updating the LAP 252B until both the projections 202B and 204B have finished updating, since they both include the denormalized column 102C that was updated in the manual on-demand refresh of the FT 100 over the partition 154B.

In the example of FIG. 3B, the projection 204B finishes updating first (362). Updating the projection 204B can include retrieving the updated data records for the denormalized column 102C over the partition 154B and storing this updated data. Once the projection 204B has finished updating, updating of the LAP 252B can thus begin (364), even though the projection 202B may not yet have finished updating. In the example of FIG. 3B, the LAP 252B is updated from the projection 204B. That is, the aggregation of the denormalized column 103F defined by the aggregate column 152F is recomputed for the unique values of the denormalized column 102C over the partition 154B as stored by the projection 204B. Updating the LAP 252B thus does not involve the projection 202B, which has not yet finished updating.

In the example of FIG. 3B, the projection 202B finishes updating (366) before the LAP 252 finishes updating (368). Updating the projection 202B, similar to updating the projection 204B, can include retrieving the updated data records for the denormalized column 102C over the partition 154B and storing this updated data. Once those of the projections 202, 204, and 206 and those of the LAPs 252 and 254 that are affected by the on-demand refresh of the FT 100 have been updated—i.e., once all three of the projection 202B, the projection 204B, and the LAP 252B have been updated—the refresh of the projections 202, 204, and 206 and the LAPs 252 and 254 responsive to the on-demand refresh of the FT 100 can be committed (370).

Figure 4:
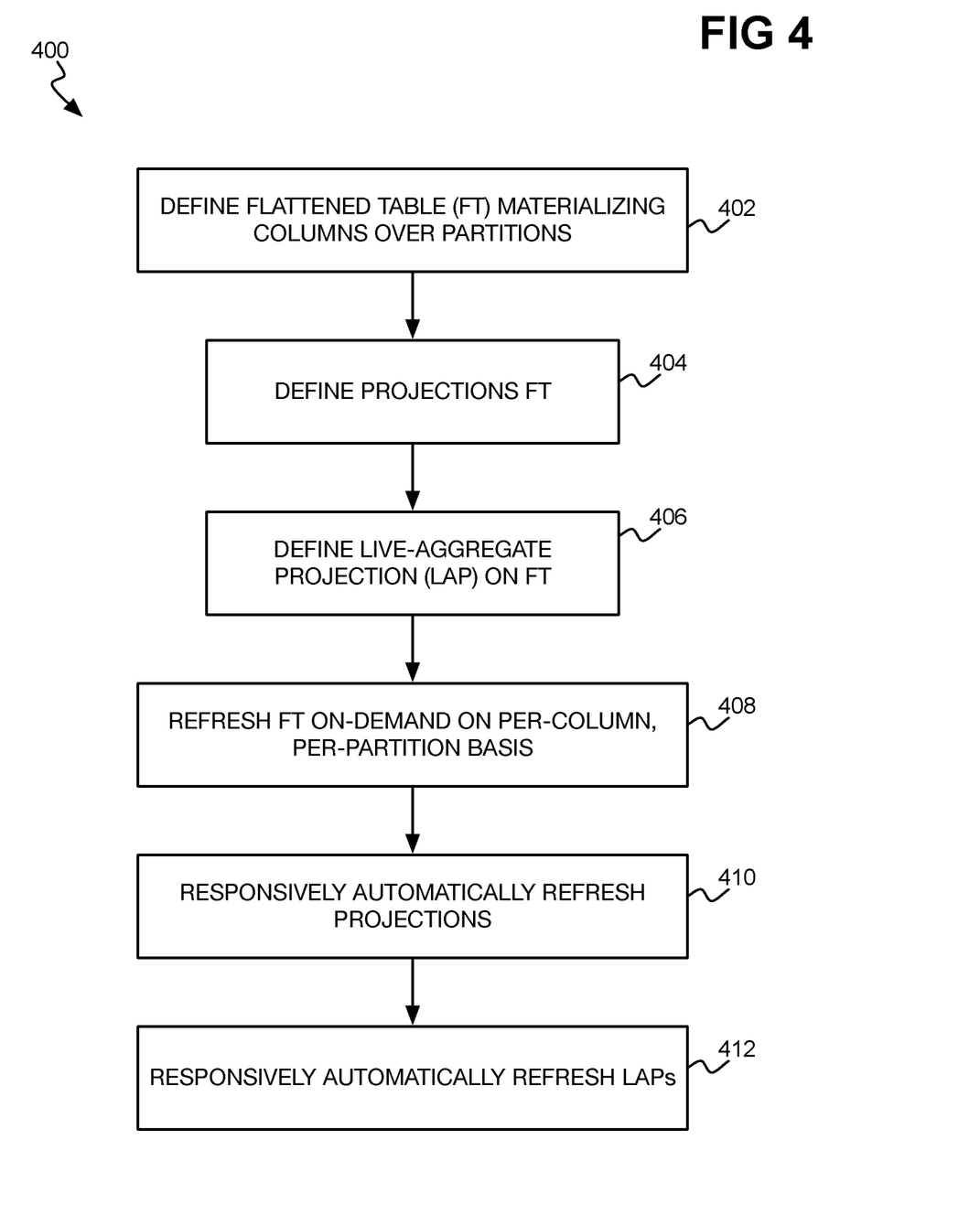
FIG. 4 is a flowchart of an example method.

FIG. 4 shows an example method 400. The method 400 can be performed by a computing system running a database management system (DBMS). For instance, the method 400 can be implemented as program code stored on a non-transitory computer-readable data storage medium that the computing system executes. The DBMS includes a database, such as a relational database like a Vertica database.

An FT 100 of the database is defined (402). The FT logically materializes denormalized columns 102 over multiple partitions 154, as well as normalized columns 103 and key columns 105. That is, as noted above, the columns 102, 103, 105, and 152 include denormalized columns from source tables 104 and 106, key columns 105 interrelating the FT 100 to the source tables 104 and 106, normalized columns 103 storing data within the FT 100 itself, and aggregate columns 152. The aggregate columns 152 each define an aggregation of one of the columns 102 and/or 103 over another of the columns 102 and/or 103.

Projections 202, 204, and 206 are defined on the FT 100 (404). Each projection 202, 204, and 206 corresponds to a selected set of the columns 102, 103, and 105, but each such set does not include any of the aggregate columns 152. The projections 202, 204, and 206 can include a super projection 202 that corresponds to a set of all the columns 102 and 103. LAPs 252 and 254 are also defined on the FT 100 (406). Each LAP 252 and 254 corresponds to one of the aggregate columns 152, and physically materializes the aggregation of the column 102 or 103 defined by the aggregate column 152 in question.

The FT 100 can be refreshed on-demand, on a per-column, per-partition basis (408). For instance, a selected denormalized column 102 of the FT 100 may be refreshed over a selected partition 154. In response, the projections 202, 204, and 206 that include the selected denormalized column 102 are automatically refreshed (410). If more than one projection 202, 204, and 206 is refreshed, they can be refreshed in parallel.

The LAPs 252 and 254 that correspond to aggregate columns 152 including the selected denormalized column 102 are also responsively refreshed automatically (412). Such LAPs 252 and 254 can be refreshed from any of the projections 202, 204, and 206 that were refreshed in part 410, such as the first such projection 202, 204, or 206 that finishes refreshing. As such, the LAPs 252 and 254 in question can begin refreshing as soon as the first projection 202, 204, or 206 that includes the selected denormalized column 102 has finished refreshing, prior to other of the projections 202, 204, and 206 that include the selected denormalized column 102 have finished refreshing.

Figure 5:
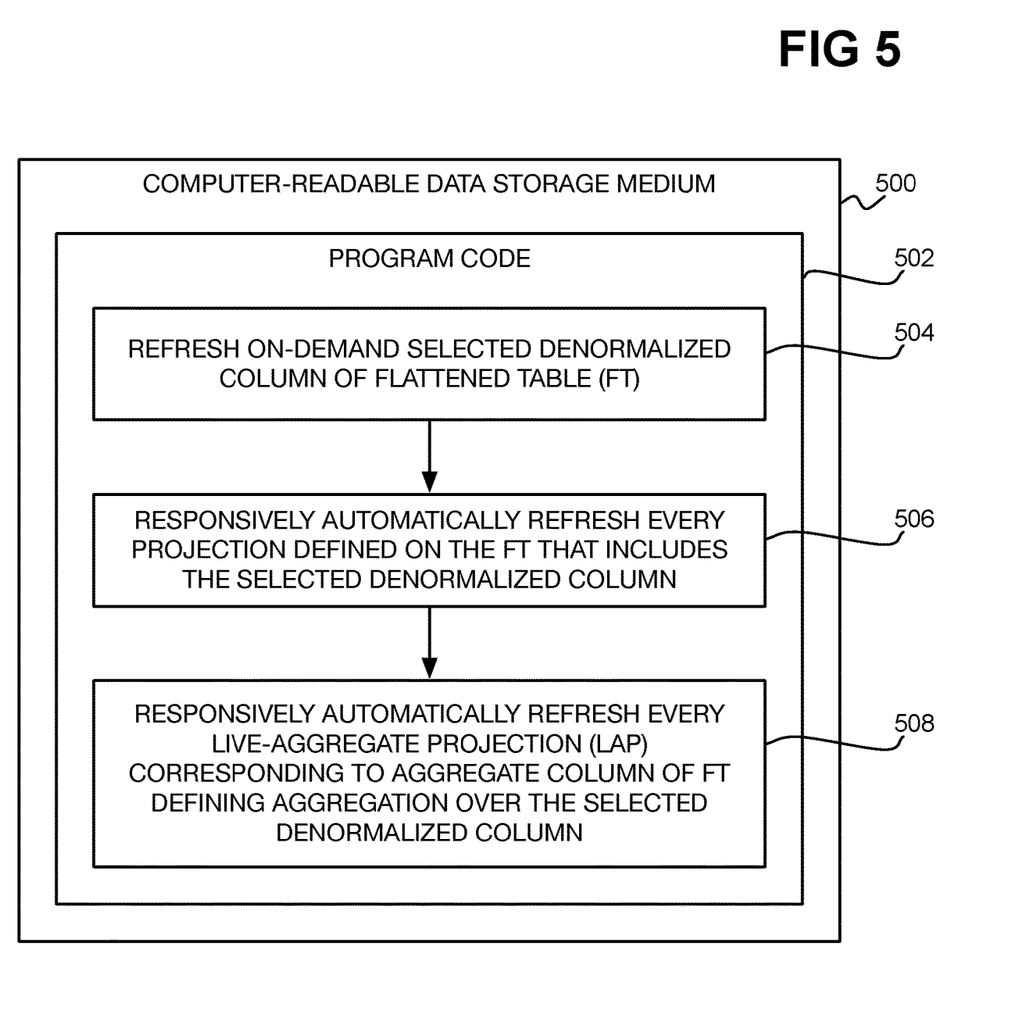
FIG. 5 is a diagram of an example non-transitory computer-readable data storage medium.

FIG. 5 shows an example computer-readable data storage medium 700. The computer-readable medium 500 stores program code 502 that a computing system on which a DBMS is running can execute. The computing system refreshes on-demand a selected denormalized column 102 of the FT 100 with respect to a particular partition 154 storing row data for this column 102 (504). The computing system responsively automatically refreshes every projection 202, 204, and 206 defined on the FT 100 that includes the selected denormalized column 102 (506). Any projection 202, 204, or 206 that does not include the selected denormalized column 102 is thus not automatically refreshed in part 506.

The computing system also responsively automatically refreshes every LAP 252 and 254 corresponding to an aggregate column 152 defining an aggregation over the selected denormalized column 102 (508). As noted above, the automatic refresh of each such LAP 252 and 254 can begin as soon as automatic refreshing of any projection 202, 204, or 206 including the selected denormalized column 102 has finished, and can be refreshed from the projection 202, 204, or 206 that finishes refreshing first. As such, automatic refresh of the LAPs 252 and 254 in question can begin prior to the automatic refresh of other projections 202, 204, and 206 that include the selected denormalized column 102 having finished. Any LAP 252 or 254 that does not correspond to an aggregate column 152 defining an aggregation over the selected denormalized column 102 is not automatically refreshed in part 508.

Figure 6:
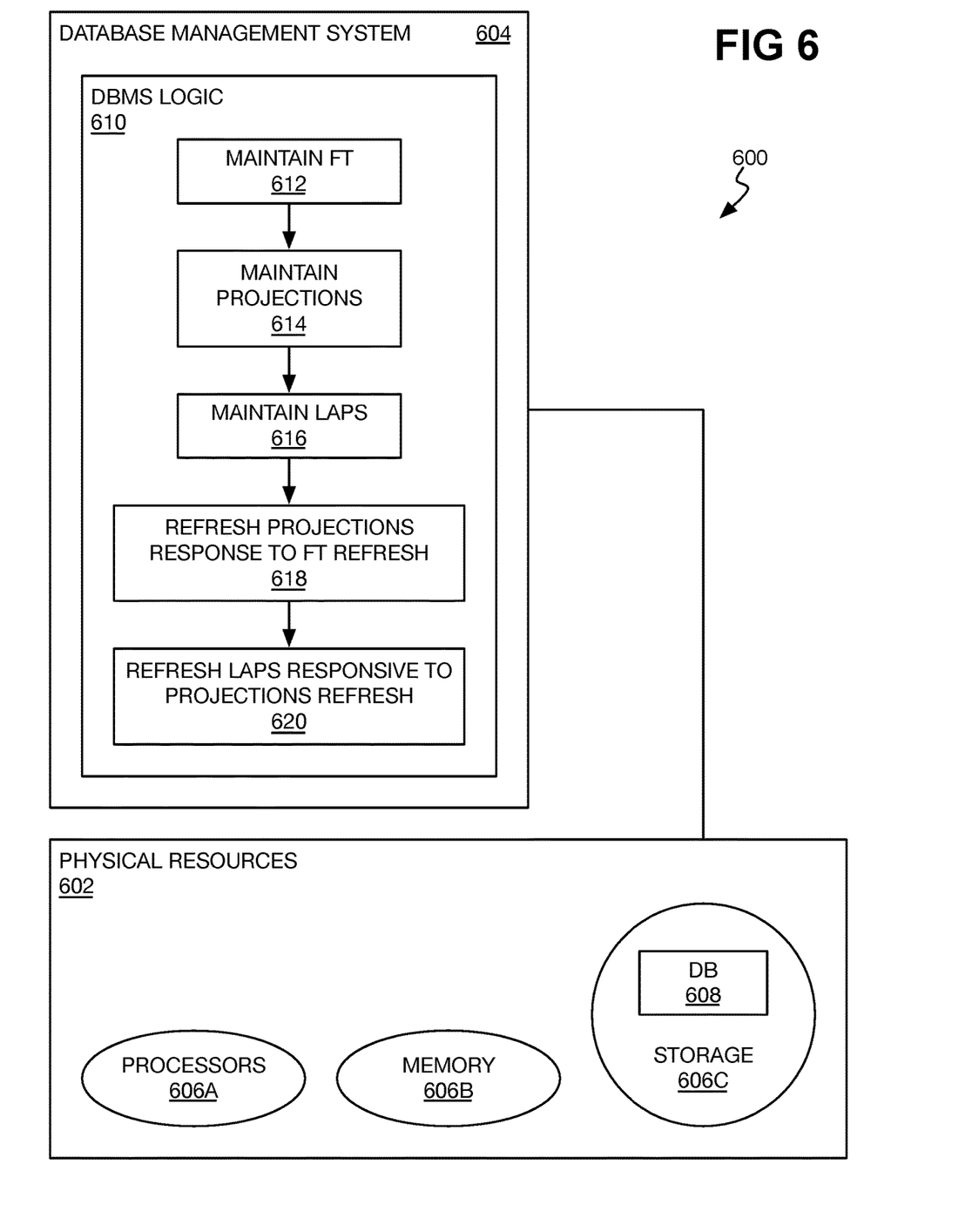
FIG. 6 is a diagram of an example computing system including a database management system (DBMS).

FIG. 6 shows an example computing system 600. The computing system 600 may be a server computing device, or a number of such devices interconnected locally or over the cloud as a distributed computing system. The computing system 600 may be a massively parallel processing (MPP) computing system. The computing system 600 includes physical resources 602 and a DBMS 604 running on the physical resources 602.

The physical resources 602 of the computing system 600 can include processor resources 606, memory resources 606B, and storage resources 606C, as well as other types of resources. The processor resources 606A can include central-processing units (CPUs) having multiple processing cores, as well as GPU. The memory resources 606B can include volatile memory such as dynamic randomly accessible memory (DRAM). The storage resources 606C can include non-volatile storage devices like hard disk drives and solid-state drives, and store a database 608 of the DBMS 604.

The computing system 600 includes DBMS logic 610. The logic 610 is said to be implemented by the physical resources in that they run on the physical resources 602 of the computing system 600. For instance, the logic 610 may be implemented as program code executed by the processing resources 606A from the memory resources 606B. In the example of FIG. 6, the DBMS logic 610 is depicted as being part of the DBMS 604.

The DBMS logic 610 maintains an FT 100 of the database 608 that logically materializes columns 102, 103, 105, and 152 over the partitions 154, including the denormalized columns 102, the normalized columns 103, the key columns 105, and the aggregate columns 152 (612). The DBMS logic 610 maintains projections 202, 204, and 206 defined on the FT 100 (614), as well as LAPs 252 and 254 defined on the FT 100 (616). The DBMS logic 610, responsive to on-demand automatic refreshing of a selected denormalized column 102 over a selected partition 154, automatically refreshes the projections 202, 204, and 206 that include the selected denormalized column 102 (618). The DBMS 610 also responsively automatically refreshes the LAPs 252 and 254 that correspond to aggregate columns 152 defining aggregations over the selected denormalized column 102, as soon as one of the projections 202, 204, and 206 that include this column 102 has finished refreshing (620).

The techniques that have been described therefore provide for the functionality of an MV while ameliorating the disadvantages associated with MVs. An FT 100 that logically materializes denormalized columns 102 from source tables 104 via key columns 105, that includes its own normalized columns 103, and that logically materializes aggregate columns 152 defining aggregations of the columns 102 and/or 103, is refreshed on-demand, on a per-partition and per-partition basis. By comparison, LAPs 254 that physically materialize these aggregations are refreshed automatically.

We claim:

1. A method comprising:
defining a flattened table (FT) of a database of a database management system (DBMS), the FT logically materializing a plurality of columns over a plurality of partitions, the columns comprising a plurality of normalized columns, a plurality of denormalized columns from a plurality of source tables of the database, and an aggregate column defining an aggregation of a selected normalized column over a selected denormalized column;
defining a plurality of projections on the FT of the database, each projection corresponding to a selected set of the denormalized columns of the FT including the selected denormalized column;
defining a live-aggregate projection (LAP) on the FT of the database, the LAP corresponding to the aggregate column and physically materializing the aggregation of the selected denormalized column over the selected denormalized column as defined by the aggregate column; and
refreshing on-demand the FT on a per-column, per-partition basis; and
responsive to refreshing on-demand the FT, automatically refreshing each projection and automatically refreshing the LAP,
wherein automatically refreshing the LAP begins as soon as one of the projections has been automatically refreshed, the LAP automatically refreshed from the one of the projections that has been automatically refreshed,
wherein the LAP physically materializes the aggregation of the selected normalized column over the selected denormalized column as defined by the aggregate column in that the LAP stores the aggregation of the selected normalized column over the selected denormalized column, redundant to storage of the selected normalized column and the selected denormalized column within the partitions,
and wherein the LAP is coupled to the selected denormalized column of the FT, such that changes in the FT are automatically propagated to the LAP through an intervening projection including the selected denormalized column.

2. The method of claim 1, wherein the projections comprise a super projection corresponding to a set of all the columns of the FT.

3. The method of claim 1, wherein refreshing on-demand of the FT on the per-column, per-partition basis refreshes the selected denormalized column over a selected partition.

4. The method of claim 3, further comprising:
responsive to refreshing on-demand the FT, automatically refreshing each projection.

5. The method of claim 1, wherein automatically refreshing the LAP begins as soon as the one of the projections has been automatically refreshed, and prior to other of the projections having been automatically refreshed.

6. The method of claim 1, wherein the FT logically materializes the columns over the partitions in that the FT logically joins the columns, including the denormalized columns from the source tables, within a single table of the database,
wherein the FT is decoupled from the source tables, such that changes in the source tables are not automatically propagated to the FT,
wherein the FT is refreshed by querying the source tables on a per-column and per-partition basis,
and wherein the source tables store row data for the denormalized columns over the partitions.

7. A non-transitory computer-readable data storage medium storing program code executable by a database management system (DBMS) running on a computing system to:
refresh on-demand a selected denormalized column of a flattened table (FT) of a database of the DBMS with respect to a selected partition storing row data for the selected denormalized column; and
responsive to refreshing on-demand the selected denormalized column of the FT, automatically refresh a plurality of projections defined on the FT of the database and that include the selected denormalized column and automatically refresh a live-aggregate projection (LAP) defined on the FT of the database and that corresponds to an aggregate column of the FT defining an aggregation over the selected denormalized column, wherein each projection corresponds to a selected set of denormalized columns of the FT of the database, wherein automatic refresh of the LAP begins as soon as one of the projections has been automatically refreshed, the LAP automatically refreshed from the one of the projections that has been automatically refreshed, wherein the LAP physically materializes the aggregation of the selected normalized column over the selected denormalized column as defined by the aggregate column in that the LAP stores the aggregation of the selected normalized column over the selected denormalized column, redundant to storage of the selected normalized column and the selected denormalized column within a plurality of partitions including the selected partition, and wherein the LAP is coupled to the selected denormalized column of the FT, such that changes in the FT are automatically propagated to the LAP through an intervening projection including the selected denormalized column.

8. The non-transitory computer-readable data storage medium of claim 7, wherein any projection of the FT defined on the FT of the database and that does not include the selected denormalized column is not automatically refreshed responsive to refreshing on-demand the selected denormalized column of the FT.

9. The non-transitory computer-readable data storage medium of claim 7, wherein the automatic refresh of the LAP begins while automatic refreshing of all the projections has not yet been completed.

10. A computing system comprising:
physical resources, including a storage device storing a database of a database management system (DBMS), a processor, and memory; and
DBMS logic implemented using the physical resources to:
maintain a flattened table (FT) of the database logically materializing a plurality of columns over a plurality of partitions on the storage device, the columns comprising a plurality of normalized columns, a plurality of denormalized columns from a plurality of source tables of the database, and an aggregate column defining an aggregation of a selected normalized column over a selected denormalized column;
maintain a plurality of projections on the FT of the database, each projection corresponding to a selected set of the columns of the FT;
maintain a live-aggregate project (LAP) on the FT of the database, the LAP corresponding to the aggregate column and physically materializing the aggregation of the selected denormalized column over the selected denormalized column as defined by the aggregate column;
responsive to on-demand refreshing the selected denormalized column of the FT over a selected partition, automatically refresh the projections that include the selected denormalized column; and
responsive to automatically refreshing the projections that include the selected denormalized column, automatically refresh the LAP as soon as one of the projections including the selected denormalized column has finished refreshing, wherein the LAP physically materializes the aggregation of the selected normalized column over the selected denormalized column as defined by the aggregate column in that the LAP stores the aggregation of the selected normalized column over the selected denormalized column, redundant to storage of the selected normalized column and the selected denormalized column within the partitions, and wherein the LAP is coupled to the selected denormalized column of the FT, such that changes in the FT are automatically propagated to the LAP through an intervening projection including the selected denormalized column.

11. The computing system of claim 10, wherein the DBMS logic is to automatically refresh the LAP from the one of the projections including the selected denormalized column that has finished refreshing.

12. The computing system of claim 10, wherein the DBMS logic is to automatically refresh the LAP before refreshing all the projections that include the selected denormalized column.

* * * * *